(12) United States Patent
Seng et al.

(10) Patent No.: US 6,754,030 B2
(45) Date of Patent: Jun. 22, 2004

(54) OPTIMAL READER-TO-WRITER OFFSET MEASUREMENT OF A HEAD IN A DISC DRIVE FOR REDUCED TRACK MISREGISTRATION

(75) Inventors: Edmun Chian Song Seng, Singapore (SG); Xiong Liu, Singapore (SG); Aik Chuan Lim, Singapore (SG); Kay Hee Tang, Singapore (SG); Utt Heng Kan, Singapore (SG); Choon Kiat Lim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 337 days.

(21) Appl. No.: 10/029,318

(22) Filed: Dec. 21, 2001

(65) Prior Publication Data

US 2003/0002197 A1 Jan. 2, 2003

Related U.S. Application Data

(60) Provisional application No. 60/301,307, filed on Jun. 27, 2001.

(51) Int. Cl.$^7$ .................................................. G11B 5/00
(52) U.S. Cl. .............................. 360/76; 360/53; 360/31; 360/77.02
(58) Field of Search .......................... 360/77.02, 77.04, 360/76, 78.04, 75, 53, 31

(56) References Cited

U.S. PATENT DOCUMENTS

| | | | |
|---|---|---|---|
| 4,939,599 A | 7/1990 | Chainer et al. | 360/77.03 |
| 5,072,318 A | 12/1991 | Yu | 360/77.02 |
| 5,500,776 A | 3/1996 | Smith | 360/77.04 |
| 5,587,850 A | 12/1996 | Ton-That | 360/77.08 |
| 5,751,512 A | 5/1998 | Anderson | 360/78.04 |
| 5,781,360 A | 7/1998 | Wilson et al. | 360/77.08 |
| 5,793,559 A | 8/1998 | Shepherd et al. | 360/78.09 |
| 5,796,543 A | 8/1998 | Ton-That | 360/77.08 |
| 5,867,353 A | 2/1999 | Valent | 360/135 |
| 5,991,115 A | 11/1999 | Chainer et al. | 360/75 |
| 5,998,994 A | 12/1999 | Mori | 324/212 |
| 6,061,201 A | 5/2000 | Woods | 360/77.06 |
| 6,317,285 B1 | 11/2001 | Bi et al. | 360/75 |

OTHER PUBLICATIONS

Kanu G. Ashar, "Magnetic Disk Drive Technology", IEEE Press, 1997, pp. 255–256, Section 9.9 Off–Track or OI Measurement.

*Primary Examiner*—David Hudspeth
*Assistant Examiner*—Mitchell Slavitt
(74) *Attorney, Agent, or Firm*—Merchant & Gould P.C.

(57) ABSTRACT

A method of and apparatus for generating a reader-to-writer offset for a head positioned over a track on a disc in a disc drive having a plurality of tracks is disclosed. A reader and a writer are mounted on the head in a non-overlapping manner with a gap between the reader and the writer, which is known as the reader-to-writer offset. A disc drive controller is operably connected to the reader and the writer. The disc drive controller determines the reader-to-writer offset of the head for each track by computing the difference between a first head position x1 and a second head position x2. The first head position x1 is an optimal head position for writing information on the track and the second head position x2 is a midpoint of an off-track capability (OTC) of the head. The OTC is a portion of a track pitch over which the reader is expected to read information that is free of an incorrigible bit error such that the writer-to-reader track misregistration (TMR) is minimized as the head is radially displaced the reader-to-writer offset to read information written on the track or to write information on the track.

20 Claims, 10 Drawing Sheets

OPTIMAL READER-TO-WRITER OFFSET MEASUREMENT OF A HEAD IN A DISC DRIVE FOR REDUCED TRACK MISREGISTRATION

RELATED APPLICATIONS

This application claims the benefit of priority of U.S. provisional application Serial No. 60/301,307 filed on Jun. 27, 2001 and titled "OFFTRACK-CAPABILITY-BASED READER/WRITER OFFSET ADJUSTMENT FOR TRACK MISREGISTRATION OPTIMIZATION."

FIELD OF THE INVENTION

This invention relates generally to head offset calibration in a disc drive, and, in particular, to measuring optimal reader-to-writer offset of a head for reduced track misregistration (TMR).

BACKGROUND OF THE INVENTION

Disc drives are data storage devices that store digital data in magnetic form on a rotating storage medium called a disc. Modern disc drives comprise one or more rigid discs that are coated with a magnetizable medium and mounted on the hub of a spindle motor for rotation at a constant high speed. Each surface of a disc is divided into several thousand tracks that are tightly-packed concentric circles similar in layout to the annual growth rings of a tree. The tracks are typically numbered starting from zero at the track located outermost the disc and increasing for tracks located closer to the center of the disc. Each track is further broken down into data sectors and servo bursts. A data sector is normally the smallest individually addressable unit of information stored in a disc drive and typically holds 512 bytes of information plus additional bytes for internal drive control and error detection and correction. This organization of data allows for easy access to any part of the discs. A servo burst is a particular magnetic signature on a track, which facilitates positioning of heads over tracks.

Generally, each of the multiple discs in a disc drive has associated with it two heads (one adjacent the top surface of the disc and another adjacent the bottom) for writing and reading data to or from a sector. Each head is mounted at the distal end of an actuator arm that extends toward the disc and pivots about the bearing shaft assembly connected to a voice coil motor in the disc drive. A read element (or a reader) and a write element (or a writer) are mounted on each head. A gap separates the reader and writer along the longitudinal axis of the actuator arm. The head skew angle, which is the angle between a tangential line to a track and the line drawn along the longitudinal axis of the actuator arm, changes as the head moves from the inner diameter to the outer diameter of the disc, and vice versa. The combination of the gap and the varying head skew angle causes the radial distance between the path of the reader on the disc and the path of the writer on the disc to be variable as the head moves from the inner diameter to the outer diameter of the disc, and vice versa. This varying radial distance between the reader and the writer is known as the reader-to-writer offset.

In general, the data storage format of a track is comprised of an alternating sequence of address headers (including servo fields) and data fields on a track. The address headers store address information, which identifies the respective addresses of the data fields. The data fields store user data. Two methods are typically used to write the address headers and data fields. The first method is to write the alternating address headers and data fields as close to the center of the track as possible. The second method is to write them in alternating sequence but to write the data fields at an offset from the servo fields in order to take into account the presence of the reader-to-writer offset. The basic difference between the first method and the second method is that the first method requires a micro minijog of the actuator arm during a write operation whereas the second method requires a micro minijog of the actuator arm during a read operation. For example according to the first method, during a write operation, the reader first reads the address headers and compares them to the target address. If the address read from an address header matches the target address, the writer writes the data in the data field. However, as soon as a target data field has been identified, the actuator arm must perform a minijog to position the writer over the data field so that the writer can write data in the target data field. The reader-to-writer offset is the distance the actuator arm must displace in order to position the writer over the target data field. This micro minijog of the actuator arm to position the writer over the data fields is not required according to the second method since the data fields are already prewritten at an offset, which is substantially equivalent to the reader-to-writer offset. However, just the opposite during a read operation, the actuator arm is required to perform a micro minijog to place the reader over the data field.

This reader-to-writer offset measurement is crucial since it will impact the disc drive performance against the track misregistration (TMR). TMR generally refers to position errors of the head between the target head position and the actual head position influenced by external disturbances such as disc flutter, runouts, disc vibrations, etc. The reader can read good data (i.e., data that contains no bit error or recoverable bit errors) only on small a portion of the track pitch (or width) of the track, and this portion of the track pitch is generally referred to as the off-track capability (OTC) of the head. For example, the OTC of a disc drive may only be about 10% of the track pitch. Thus, the reader or the writer must be positioned within the OTC (i.e., within the 10% of the track pitch) in order to successfully read information from or write data to the track.

If the reader-to-writer offset measurement contains an error, one outcome is that the target head position may not be within the OTC of the head. The other outcome is that the target head position may not be located at the center of the OTC although it may be within the OTC of the head. In such a case, the target head position would still allow the reader to successfully read good data written on the track but would not provide optimal protection against the TMR. This is because the target head position would be located closer to one of the two edges of the OTC, and there exists higher probability that the external disturbance might displace the head outside the OTC of the head.

The main technique that is currently used to determine the reader-to-writer offset is known as the bit-error-rate (BER) technique; however, this technique does not require that the target head position be located at the center of the OTC of the head. Accordingly, there is a need for determining an optimal reader-to-writer offset value that allows the target head position to be located at the center of the OTC of the head and provides better protection against TMR.

SUMMARY OF THE INVENTION

Against this backdrop, the present invention has been developed. The present invention essentially is a method of and an apparatus for generating an optimal reader-to-writer offset for a head positioned over a track on a disc in a disc drive having a plurality of tracks. A reader and a writer are mounted on the head in a non-overlapping manner with a gap between the reader and the writer, which is known as the reader-to-writer offset.

A disc drive controller is operably connected to the reader and the writer. The disc drive controller determines the reader-to-writer offset of the head for each track by computing the difference between a first head position x1 and a second head position x2. The first head position x1 is an optimal head position for writing information on the track and the second head position x2 is a midpoint or a center of an off-track capability (OTC) of the head for a given track. The OTC is a portion of a track pitch over which the reader is expected to read information that is free of an incorrigible bit error such that the writer-to-reader track misregistration (TMR) is minimized as the head is radially displaced the reader-to-writer offset to read information written on the track or to write information on the track.

The head is optimally positioned for writing information on the track when the center of the writer is positioned over the center of the track pitch. Further, the information written on the track is deemed to be free of an incorrigible bit error if the bit-error-rate (BER) computed after reading the information over a plurality of disc revolutions is less than a predetermined threshold BER value.

The second head position x2 is determined by measuring a first head position parameter P1 and a second head position parameter P2 and computing the midpoint between the first head position parameter P1 and the second head position parameter P2. The first head position parameter P1 and the second head position parameter P2 are the two end points of the OTC of the head. The first head position parameter P1 is the first head position nearest the first edge of the track pitch on which the BER is less than or equal to the minimum threshold BER value. The second head position parameter P2 is the second head position nearest the second edge of the track pitch on which position the BER is less than or equal to the minimum threshold BER value.

The first head position parameter P1 is determined by positioning the reader over the first edge of the track pitch, measuring BER over a predetermined number of disc revolutions, and comparing the BER with the predetermined threshold BER value. If the BER is greater than the predetermined threshold BER value, the reader is displaced by a predetermined distance toward the center of the track pitch and the steps above are repeated until the BER is less than or equal to the predetermined threshold BER value. The head position on which the BER is less than or equal to the predetermined threshold BER value is then stored in a memory.

The second head position parameter P2 is determined by positioning the reader over the second edge of the track pitch, measuring BER over a predetermined number of disc revolutions, and comparing the BER with the predetermined threshold BER value. If the BER is greater than the predetermined threshold BER value, the reader is displaced by a predetermined distance toward the center of the track pitch and the steps above are repeated until the BER is less than or equal to the predetermined threshold BER value. The head position on which the BER is less than or equal to the predetermined threshold BER value is then stored in the memory.

These and various other features as well as advantages that characterize the present invention will be apparent from a reading of the following detailed description and a review of the associated drawings.

DETAILED DESCRIPTION

Figure 1:
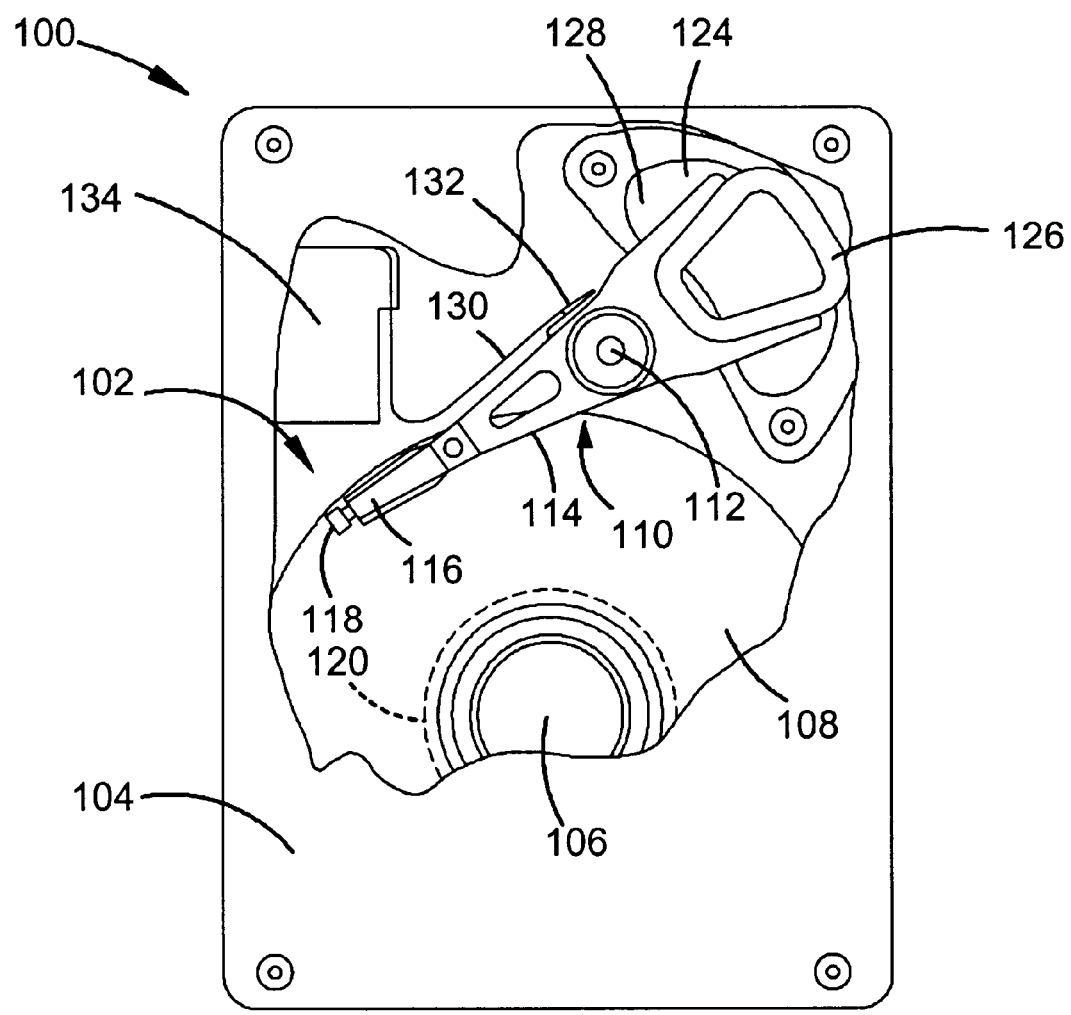
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 116 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
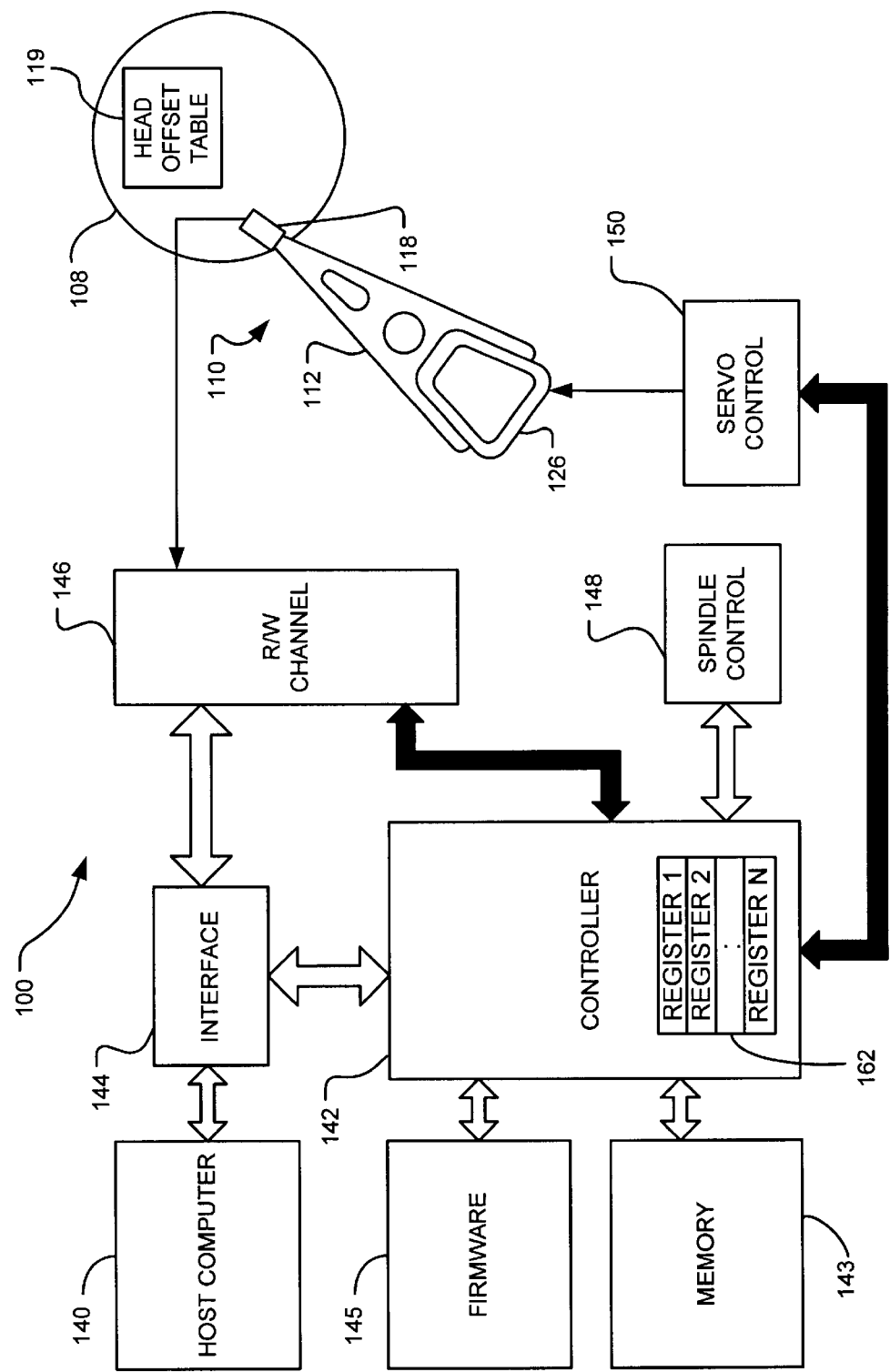
FIG. 2 is a simplified block diagram of a disc drive and its connection to the host computer system including a servo system with which the present invention is particularly useful.

Referring now to FIG. 2, shown therein is a functional block diagram of the disc drive 100 of FIG. 1, generally showing the main functional circuits that are resident on the disc drive printed circuit board and used to control the operation of the disc drive 100. A controller 142 generally provides top-level communication between the disc drive 100 and a host computer 140 that is operably connected to the disc drive 100 and also provides control of the disc drive 100 with the ability to execute programs stored in a memory 143 and/or a firmware 145. A set of registers 162 is included in the controller 142. The register 162 is one of a small set of data holding places that are part of the controller and that provides a place for passing data from one instruction to the next sequential instruction or to another program that the controller 142 has given control to.

The memory 143 may be a random access memory (RAM), a read only memory (ROM), or other sources of resident memory for the controller 142. The memory 143 may include spaces for general data store and/or store of programming modules. Each programming module stores computer readable instructions that are typically executable by the controller 142. The programming modules may be stored in the firmware 145 rather than in the memory 143. A set of programming instructions may be stored in the firmware 145 by the host computer 140 via a disc drive interface 144. Generally, the programming instructions in the firmware 145 can be distributed like other software modules and can be created and tested by utilizing microcode simulation. The firmware 145 is often a key component of the disc drive operation, because it contains generally the software program for disc drive operations that could operate independently from the control of the host computer 140.

The discs 108 are rotated at a constant high speed by a spindle control circuit 148, which typically electrically commutates the spindle motor 106 (FIG. 1) through the use of back electromotive force (BEMF) sensing. During a seek operation, the track position of the heads 118 is controlled through the application of current to the coil 126 of the actuator assembly 110. A servo control circuit 150 provides such control. During a seek operation, the controller 142 receives information regarding the velocity and acceleration of the head 118 and uses that information in conjunction with a model, stored in the memory 143, to communicate with the servo control circuit 150, which will apply a controlled amount of current to the voice coil motor 126, thereby causing the actuator assembly 110 to be pivoted.

Data is transferred between the host computer 140 and the disc drive 100 by way of the disc drive interface 144, which typically includes a buffer to facilitate high speed data transfer between the host computer 140 and the disc drive 100. Data to be written to the disc drive 100 are thus passed from the host computer to the disc drive interface 144 and then to a read/write channel 146, which encodes and serializes the data and provides the requisite write current signals to the heads 118. To retrieve data that has been previously stored by the disc drive 100, read signals are generated by the heads 118 and provided to the read/write channel 146, which performs decoding and error detection and correction operations and outputs the retrieved data to the interface 144 for subsequent transfer to the host computer 140.

Generally, the disc drive interface 144 includes hardware and/or software that regulates transmission of data and manages the exchange of data between the disc drive 100 and the host computer 140. This disc drive interface 144 is contained in the electronics of the disc drive 100. A standard committee such as American National Standard Institute (ANSI) oversees the adoption of an interface protocol by which any peripheral device following the common standard can be used interchangeably. Programming of the firmware 145 follows the disc drive interface protocol.

There are various types of disc drive interface standards such as Small Computer Systems Interface (SCSI), FibreChannel-Arbitrated Loop (FC-AL), Serial Storage Architecture (SSA), Advanced Technology Attachment (ATA), Integrated Device Electronics (IDE), CompactFlash, etc. In an embodiment of the present invention, the ATA interface standard is used as an interface between the host computer 140 and the disc drive 100. However, it is well known to those skilled in the art that the same scope and spirit disclosed in an embodiment of the present invention can also be applied to other types of disc drive interfaces listed above.

Figure 3:
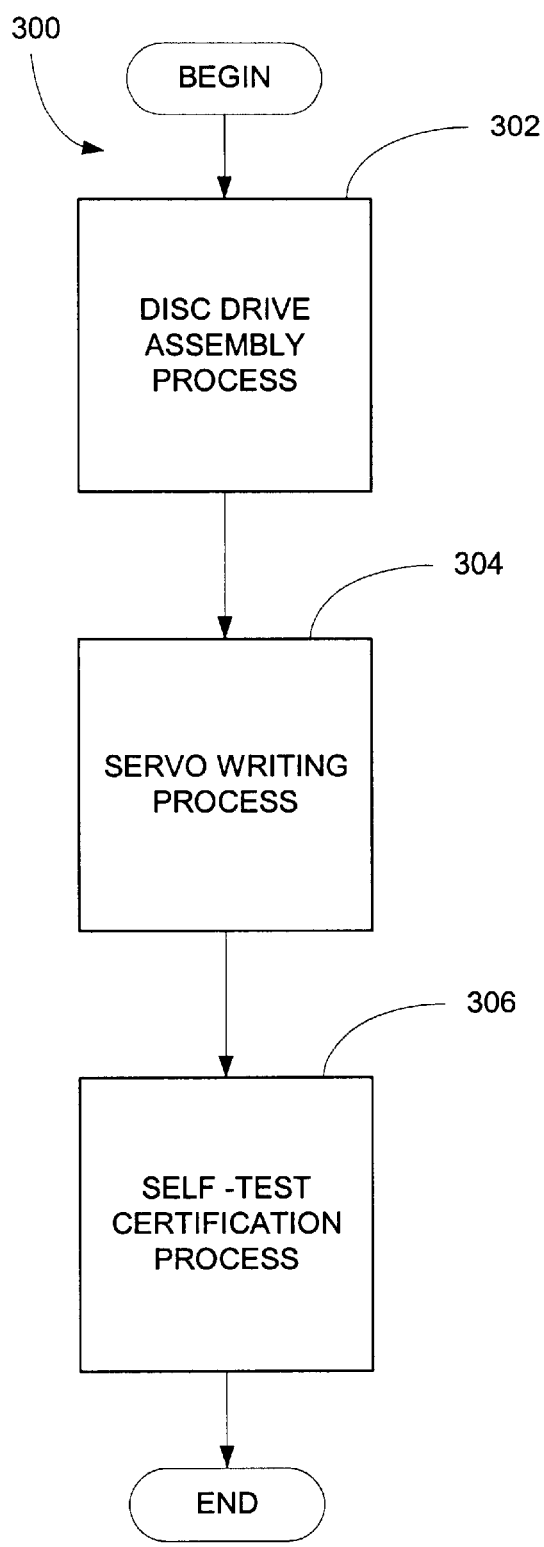
FIG. 3 is a simplified flowchart of a disc drive manufacturing process in accordance with an embodiment of the present invention.

A typical disc drive 100 is basically manufactured by a process shown in FIG. 3. The disc drive components are first assembled in the manufacturing process in operation 302. Then the servo information that defines tracks is written on the discs 108 in the disc drive 100 in a servowriter in operation 304. Thereafter, the disc drive controller conducts a self-test certification process in operation 306 to determine whether or not the disc drive 100 is a good or bad drive and to record operational parameters on the disc 108 if the disc drive 100 is determined to be a good drive. For example, the entire data storage area of each disc 108 may be scanned in the self-test certification process 306 to detect micro defects in sectors. If the total number of identified micro defects is more than the predetermined threshold, the disc drive 100 may be determined as a bad drive in process 306. Alternatively, if the total number of identified defects is less than the predetermined threshold, the disc drive 100 may be determined as a good drive. All of the identified defective sector addresses are then stored in a set of sectors on the reference tracks that are not accessed by a user during normal operations. During each subsequent power-up of the disc drive, the operational parameters stored on the reference tracks of the disc are recalled to the memory 143 for use during normal disc drive operations.

Figure 4:
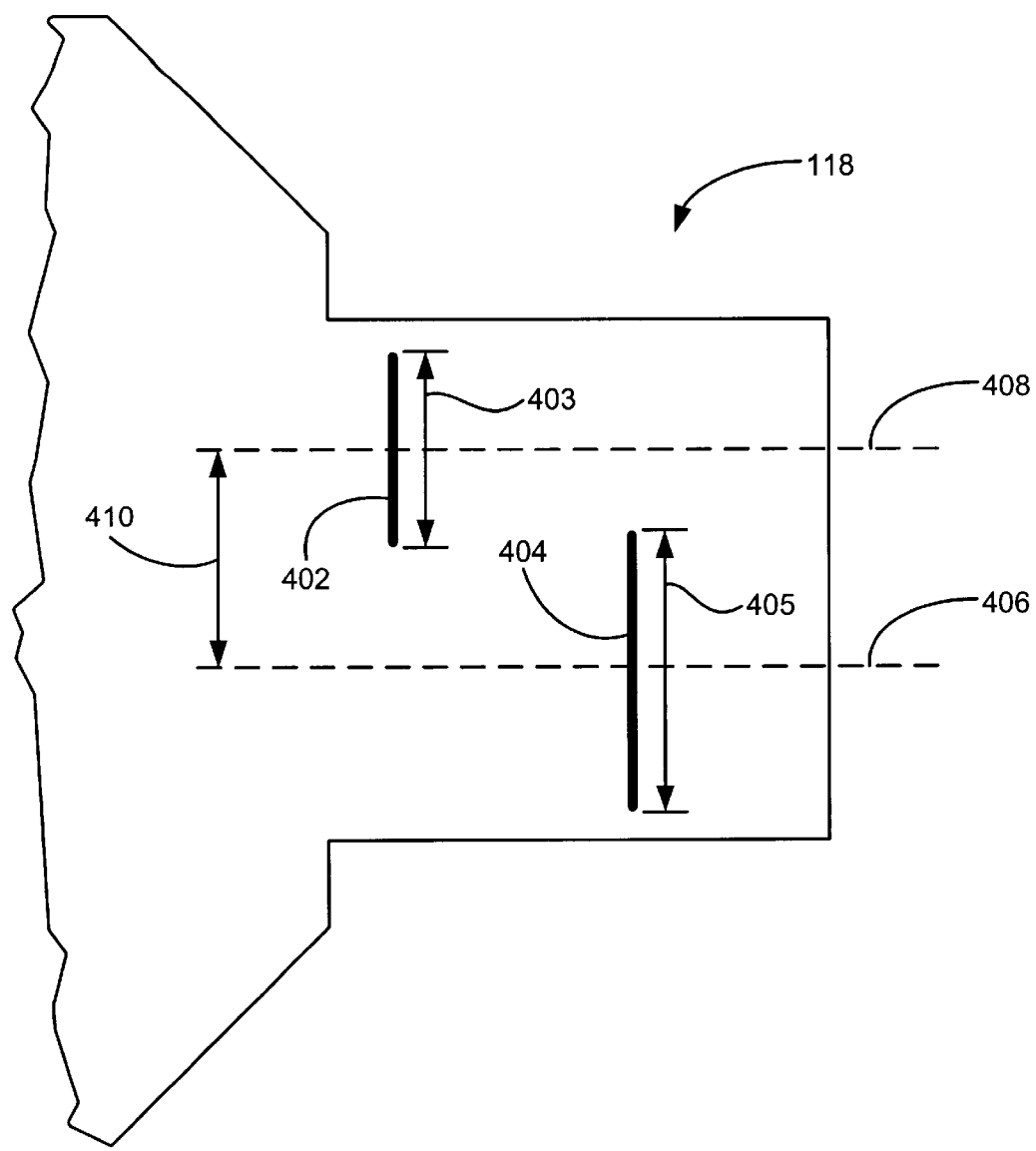
FIG. 4 is a generalized diagrammatic illustration of a portion of the head mounted at the distal end of the actuator arm in a disc drive in accordance with an embodiment of the present invention.
Figure 6:
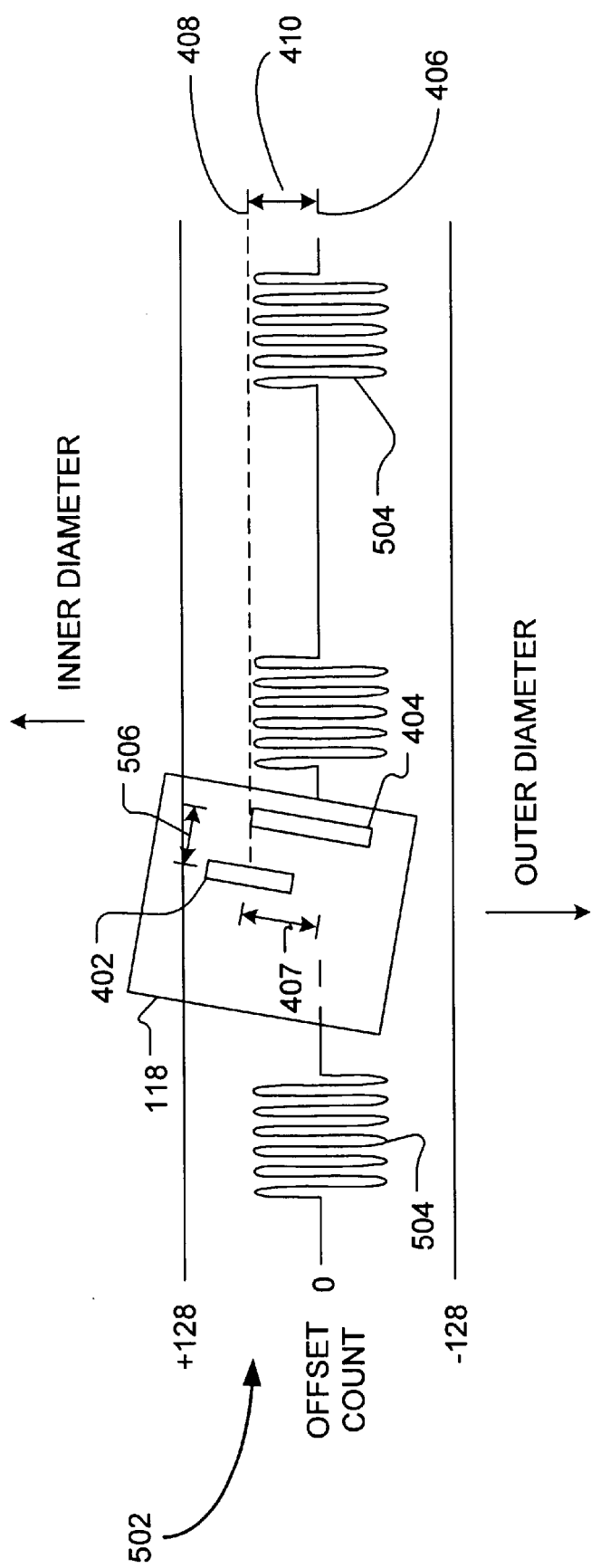
FIG. 6 is an enlarged view of the reader and the writer mounted on the head positioned over a track that is recorded with a signal such as grey code, servo burst pattern, general data, etc.

A head offset table 119 (FIG. 2) is one such area for storing operational parameters on the reference track for storing one type of disc drive operational parameter known as a reader-to-writer offset 410 (FIGS. 4 and 6). The head offset table 119 stores the reader-to-writer offset values for the head 118 for each track. Typically, the reader-to-writer offset 410 is measured on the first track of each zone. There are typically thirteen zones on the disc 108, but the number of zones on the disc is a matter of design choice. Typically, the reader-to-writer offset values corresponding to only the first tracks in the zones are stored in the head offset table 119. During the power-up of the disc drive 100, these reader-to-writer offset values are transferred to the memory 143 for use during normal operations of the disc drive 100. The tracks that are in between the two first tracks of two consecutive zones are interpolated, and this interpolation process is described in the latter part of this specification.

Figure 5:
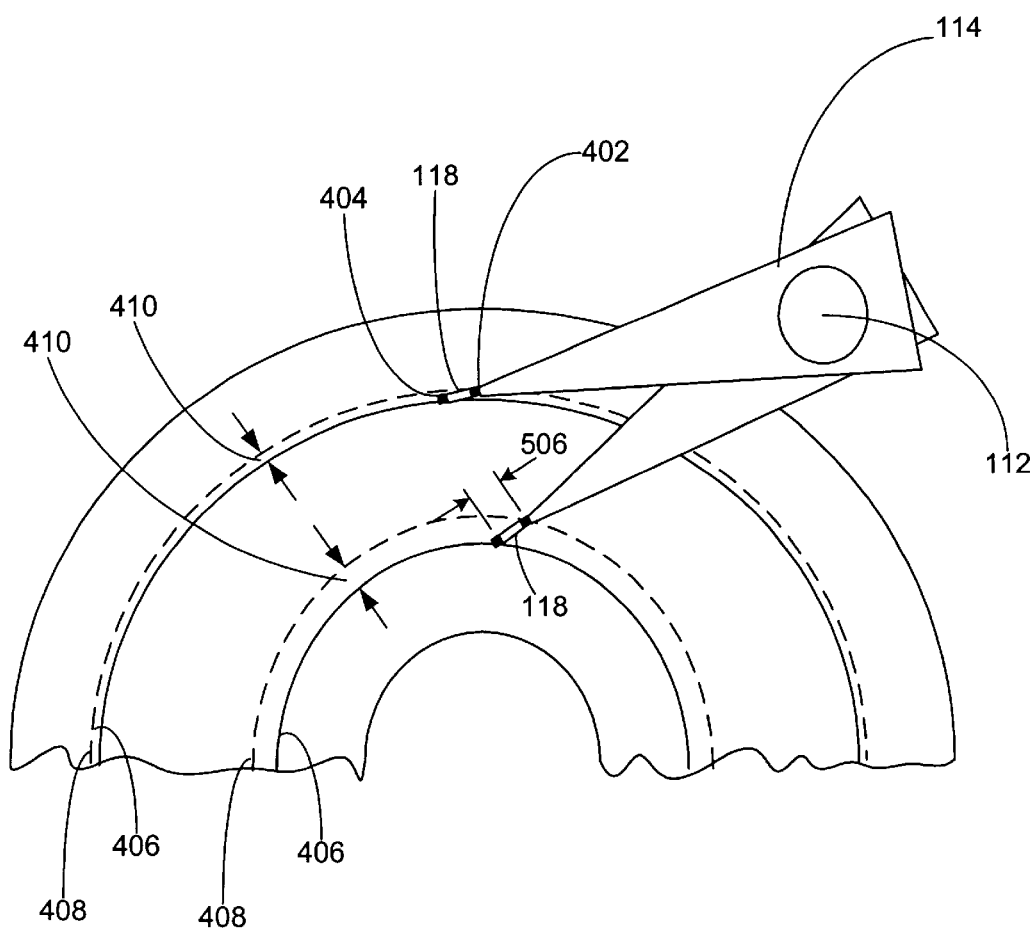
FIG. 5 shows a separate reader and a writer mounted on the head that is mounted at the distal end of the rotary actuator arm, which pivots about the bearing shaft assembly, to generally illustrate that the reader-to-writer offset varies as the actuator arm radially traverses over the disc.

The reader-to-writer offset 410 is described in more detail with reference to FIGS. 4–6. Note that the series of the elements shown in FIGS. 4–6 are grossly exaggerated (not drawn to scale) and drawn for an illustration purpose only. FIG. 4 is a generalized diagrammatic illustration of a portion of the head 118 mounted at the distal end of the actuator arm 114. The head 118 includes a read element (or a reader) 402 and a write element (or a writer) 404. The reader 402 has a width (referenced at 403) and is centered along its width about centerline 408. The writer 404 also has a width (referenced at 405) and is centered along its width about centerline 406. The gap measured between the two centerlines 406 and 408 when these two centerlines 406, 408 run in parallel with a line that is tangential to a track is known as the reader-to-writer offset 410. The gap (the reader-to-writer offset 410) is variable depending on the skew angle of the actuator arm 114, and this aspect of varying reader-to-writer offset 410 is further illustrated with respect to FIG. 5.

FIG. 5 shows a separate reader 402 and a writer 404 mounted on the head 118 that is mounted at the distal end of the rotary actuator arm 114, which pivots about the bearing shaft assembly 112. A gap 506 along the longitudinal axis of the actuator assembly arm 114 exists between the reader 402 and the writer 404. The head skew angle, which is the angle between a tangential line to a track and the line drawn along the longitudinal axis of the actuator arm 114, changes as the head 118 moves from the inner diameter to the outer diameter of the disc, and vice versa. The combination of the gap 506 and the varying head skew angle causes the radial distance defined by the reader-to-writer offset 410 between the path of the reader 408 (or the centerline 408) and the path of the writer 406 (or the centerline 406) to vary as the head 118 moves from the inner diameter to the outer diameter of the disc 108, and vice versa.

FIG. 6 is an enlarged view the reader 402 and the writer 404 on the head 118 over a track 502 that is recorded with a signal 504 (e.g., grey code, servo burst pattern, general data, etc.). The writer 404 is centered at the offset count position of 0. The width of the track 502, also known as the track pitch, is defined by a range of offset counts that spans from +128 to −128, and the center of the track pitch is located at the offset count position 0. Although the offset count length of 1 is defined as 1/256 of the track length in FIG. 6, the size of one offset count length is a matter of design choice, and the track pitch can be subdivided into even smaller units of offset count for finer positioning control of the head 118 over the track 502. The center of the signal at the offset count position of 0 aligns with the writer centerline 406. At this offset count position of 0, the signal 504 passes directly underneath the center of the writer 404. However, the center of the reader 402 (or the reader centerline 408) is not positioned over the center of the signal 504. The reader centerline 408 is positioned away from the center of the signal 504 (which coincides with the writer centerline 406) by the reader-to-writer offset 410. The reader 402 therefore has to be displaced by the reader-to-writer offset 410 in order to read the signal 504 written by the writer 404.

As previously discussed, the reader-to-writer offset 410 for a track varies from one track to another track since the head skew angle varies as the head 118 traverses from inner diameter to outer diameter of the disc, and vice versa. Thus, each track has a different reader-to-writer offset 410 value. The reader-to-writer offset 410 value for each track on the disc therefore has to be determined so that the controller 142 can position the reader 402 over the track for accurate reading of the signal on the track in a manner that produces the least amount of error.

The bit-error-rate (BER) technique is one approach used for determining the reader-to-writer offset 410. BER is defined as the relationship between the number of bits read incorrectly by the reader 402 and the total number of bits read by the reader 402, and it is represented by the following equation:

$$BER = \text{(the number of bits read in error)}/\text{(the total number of bits read)}.$$

BER is usually specified as a number times 10 raised to a negative exponent. Intuitively, the lowest BER would be measured at the center of the track 502 (i.e., the offset count position 0) since the data is theoretically targeted to be written at the track center. BER would increase as the reader 402 moves away from the offset count position 0 toward either the inner diameter or the outer diameter of the disc 108. The reader-to-writer offset 410 is determined by measuring a first head position (x1) when the center of the writer 404 is aligned with the center of the signal 504 on the track 502. Then, the reader 402 beginning at the offset count position +128 traverses across the track while monitoring BER moving toward the offset count position 0 and then toward the offset count position −128. The second head position (x2) is then recorded when BER is the lowest. Theoretically, the second head position (x2) is located at the track center (i.e., the offset count position 0), but this is not necessarily true in a typical disc drive. The reader-to-writer offset 410 is determined by taking the difference between x1 and x2 (i.e., |x1−x2|).

Figure 7:
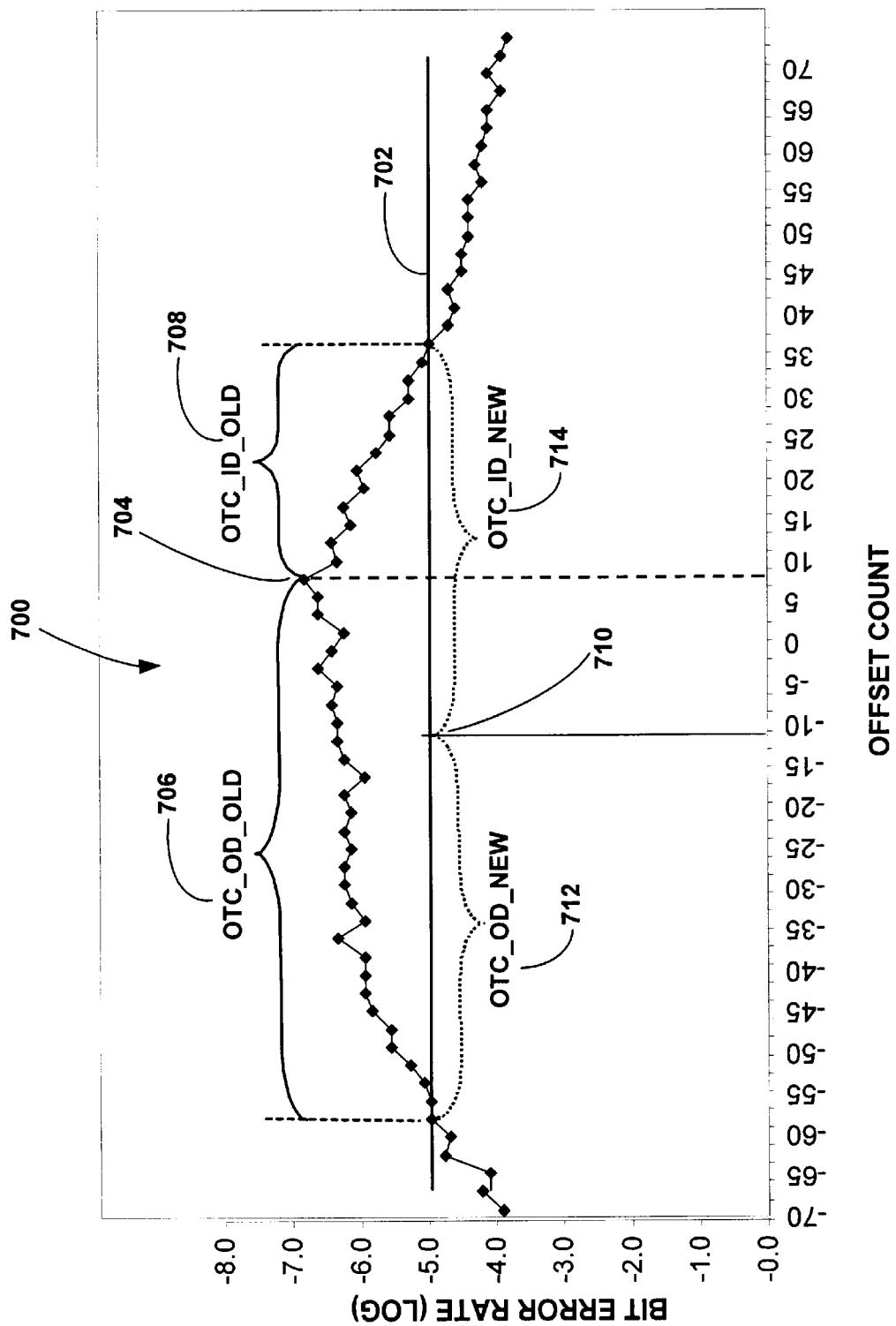
FIG. 7 shows a BER profile, which is a series of BER values measured across the track pitch or the track width, of a typical track such as the track shown in FIG. 6 in accordance with an embodiment of the present invention.

FIG. 7 shows a BER profile 700 (i.e., a series of BER values measured across the track pitch or the track width) of a typical track such as the track 502 shown in FIG. 6. The track pitch according to the present invention (as shown in FIG. 6) is 256 offset counts wide, and the length of one offset count is therefore equivalent to 1/256 of the track pitch. However, for illustration purposes here, the BER profile 700 is shown with respect to the offset count positions ranging from −70 to +70 although the full track pitch in this example is 256 offset counts wide.

To determine the BER profile 700 across the track pitch, the reader 402 is first positioned over one end of the track width (e.g., the offset count position −128 as shown in FIG. 6). The reader 402 then reads the recorded data on the track over a predetermined number of disc revolutions and monitors the BER. In an illustrative embodiment, the BER at this offset count position is then computed. The reader 402 is then displaced by a short distance toward the center of the track (e.g., the offset count position −120). Thereafter, the reader 401 again reads the data on the track over a predetermined number of disc revolutions, and the BER at this new offset count position is computed. This process repeats until the reader 402 traverses across the entire track pitch, ending at the other end of the track width (e.g., the offset count position +128 as shown in FIG. 6). The offset count position that produces the lowest BER is then selected as the second head position (x2), which is typically at or near the midpoint of the track width (i.e., the offset count position 0).

According to the BER profile 700, the lowest BER is at the offset count position +8 (referenced at 704), and this then becomes the second head position (x2) of the present invention.

In order for the data read by the reader 402 to be good data to a user, BER measured at a particular offset count position must be lower than a minimum BER threshold value 702. The minimum BER threshold value 702 of the present invention is defined as $10^{-5}$ or $-5$ in the log scale (i.e., $-5=\log_{10}(10^{-5})$). This means that data that contains more than one bit of error out of ten thousand bits of information read is unrecoverable bad data. The BER profile 700 indicates that the BERs measured at any offset count position in the range of offset count positions from $-58$ to $+38$ are lower than the minimum BER threshold value. Thus, the reader 402 is expected to read good data whenever the reader 402 is positioned at any one of these offset count positions, from $-58$ to $+38$.

This range of offset count positions (i.e., $-58$ to $+38$) that allows successful reading of data on the track is also referred to as an off-track capability (OTC) of the head 118. The head 118 is said to have better OTC on a particular track if the range of offset count positions that allows successful reading of data on the track is greater than on another track that has smaller range of offset count positions. How wide or narrow is this range of offset count positions or OTC signifies the ability of the disc drive system to handle track misregistration (TMR) without exceeding the minimum BER threshold value.

As described above, the head position (x2) is determined at the offset count position where BER is the lowest in order to compute the reader-to-writer offset 410 (i.e., $|x1-x2|$). The BER profile 700 indicates that the lowest BER is present at the offset count position +8 (referenced at 704). Thus, for example, if x1 were at the offset count position +100, then the reader-to-writer offset 410 would be 92 (i.e., $|100-8|$). This reader-to-writer offset value is then recorded and later utilized by the controller 142 to position the reader 402 to read data written on the track after writing data using the writer 404.

However, the lowest BER offset count position (x2) 704 is not at the midpoint of the OTC (i.e., the range of the offset count positions that allows a successful reading of data on the track). As shown in FIG. 7, the portion of the OTC, (OTC_OD_OLD) 706, that is on the left side of (x2) 704 (near the outside diameter of the disc) is wider than the portion of the OTC, (OTC_ID_OLD) 708 that is on the right side of (x2) 704 (near the inside diameter of the disc). Theoretically, however, the OTC profile (as shown in 700) should be symmetrical with respect to the lowest BER offset count position (x2) 704. Nevertheless, this OTC profile symmetry is impossible to achieve due to variations that are inevitably introduced to the disc drive during the manufacturing stage. For example, there may be some manufacturing variations that produce stronger write-field on one side of the writer 404 (e.g., the side near the outside diameter of the disc 108) than on the other side of the writer 404 (e.g., the side near the inside diameter of the disc 108). In addition, there may be some manufacturing variations that produce greater read-sensitivity on one side of the reader 402 (e.g., the side near the outside diameter of the disc 108) than on the other side of the reader 402 (e.g., the side near the inside diameter of the disc 108). Further, variations of the skew angle of the actuator arm 114 when placing the head 118 on the track may contribute to uneven symmetry of the OTC profile.

The uneven symmetry of the OTC profile generally means that the head 118 is more sensitive to the outside disturbances that cause TMR. The fact that the OTC_ID_OLD 708 is not as wide as the OTC_OD_OLD 706 as shown by the BER profile 700 indicates that the head 118 is more susceptible to the external disturbances that can displace the head toward the inside diameter. Thus, an external disturbance that can displace the reader 402 toward the inside diameter of the disc by a distance that is greater than the OTC_ID_OLD 708 will cause a read error due to TMR.

There are various types of external disturbances adversely affecting accurate positioning of the head 118 on the disc 108. Negative effects such as disc flutter, disc runouts, and/or external shock/vibration can cause the head 118 to be mispositioned away from the intended offset count position on the track and produce TMR. There are two types of TMR: a writer-to-writer TMR and a writer-to-reader TMR. The writer-to-writer TMR deals with mispositioning of the writer 404 as it seeks to an adjacent track from a recorded track. The writer-to-writer TMR typically affects the spacing between two adjacent tracks, and this is also generally known as the track squeeze. The present invention, however, is directed to more effective handling of the effects of the writer-to-reader TMR. The writer-to-reader TMR deals with mispositioning of the reader 402 (or alternatively, the writer 404) as it moves over to its intended offset count position of the track pitch from the previous head position at which the writer 404 (or alternatively, the reader 402) was positioned over the same track. For example, in order to write data in a data sector on a track, the reader 402 has to first read, inter alia, the grey code information that identifies the data sector. Once the data sector is identified as the correct data sector by the reader 402, the writer 404 would then write data in the data sector. Therefore, the reader 402 or the writer 404 must be displaced by the reader-to-writer offset 410 in order to position itself over the intended offset count position of the track pitch whenever the head 118 sequentially reads information from and write information to sectors that are on the same track. If the reader 402 or the writer 404 misses the intended offset count position on the track, this displacement error is referred to as the writer-to-reader TMR.

One of the major components that cause the writer-to-reader TMR in a disc drive is non-repeatable runout (NRRO) that is generated largely due to vibrations from the spindle motor assembly. NRRO as implied by its name is not repeatable (i.e., the disturbance does not repeat at the same circumferential position on the track) but rather occurs in a random manner at difference locations of the disc 108. If, for example, the OTC (i.e., the total range of offset counts where the BERs are above the minimum threshold BER value) of a disc drive is about 10% of the track pitch, the writer-to-reader TMR must be controlled within 10% of the track pitch. That is, the combined effect from each of the external disturbances that contributes to the writer-to-reader TMR should not displace the reader 402 or the writer 404 on the head 118 outside the OTC of the head 118, which is about 10% of the track pitch.

Empirically it can be shown that the writer-to-reader TMR can be controlled within about 10% of the track pitch (i.e., about 26 offset counts) if NRRO that can displace about 5% of the track pitch is present in the disc drive. This also means that in order to control the writer-to-reader TMR within 10% of the track pitch, the NRRO that contributes to the writer-to-reader TMR must be controlled within 5% of the track pitch. This relationship between the percentage of a track pitch required for controlling the writer-to-reader TMR (hereinafter referred to as "$TP_{WRTMR}$") and the percentage of the track pitch that is affected by the external disturbances including NRRO (hereinafter referred to as "$TP_{OTHERS}$" for the displacement due to other disturbances and "$TP_{NRRO}$" for the displacement due to NRRO) is shown by the following equation:

$$TP_{WRTMR} = [2*(TP_{NRRO})^2 + (TP_{OTHERS})^2]^{1/2}.$$

In general, $TP_{WRTMR}$ should be less than the width of the OTC. For example, $TP_{WRTMR}$ by applying the above equation would increase to 14.6% of the track pitch if $TP_{NRRO}$ was 9% of the track pitch instead of 5% of the track pitch. In other words, the writer-to-reader TMR needs to be controlled within 14.6% of the track pitch. This would then require the OTC of more than 14.6% of the track pitch, and there would be a serious writer-to-reader TMR problem if the OTC of the disc drive remained as 10% of the track pitch.

$TP_{WRTMR}$ is also affected if the reader-to-writer offset 410 (i.e., $|x1-x2|$) is not computed correctly or optimally. Incorrect determination of x2 would introduce an error to the reader-to-writer offset 410 measurement. For example, the OTC of 10% of the track pitch would be reduced to 9% if there were an error of 1% of the track pitch in the reader-to-writer offset 410 measurement. This means that the reader-to-writer TMR has to be controlled within 9% of the track pitch (i.e., $TP_{WRTMR}$ 9%) instead of the 10% of the track pitch. This also means that TMR caused due to NRRO has to be controlled within 3.9% of the track pitch (i.e., $TP_{NRRO}$=3.9%) if the displacement due to TMR caused by other disturbances (i.e., $TP_{OTHERS}$) remains the same. For example, $TP_{OTHERS}$ can be computed to be 7.07% of the track pitch for $TP_{WRTMR}$ of 10% of the track pitch and for $TP_{NRRO}$ of 5% of the track pitch. Then, $TP_{NRRO}$ of 3.9% can be computed by applying $TP_{WRTMR}$ of 9% and $TP_{OTHER}$ of 7.07% to the equation (i.e., $9 [2*(TP_{NRRO})^2+(7.07)^2]^{1/2}$).

Thus, incorrect or non-optimal measurement of the reader-to-writer offset 410 would require the disc drives to be manufactured with a stricter tolerance requirement in order to minimize the effects of NRRO and other external disturbances on the head 118. As shown above, 1% of the track pitch error in the reader-to-writer offset 410 measurement would reduce $TP_{NRRO}$ by 1.1% of the track pitch (i.e., from 5% to 3.9% of the track pitch). The complexity of the servo and mechanical subsystem in the disc drive then would have to be greatly increased in order to accomplish this stricter tolerance requirement. It would lead to significant manufacturing cost increase and be a serious burden on high-density disc drive manufacturing process. Therefore, the reader-to-writer offset 410 needs to be determined an optimal value that would not diminish $TP_{WRTMR}$ and free from any computational error.

As shown in FIG. 7, the offset count position at which position BER was the lowest (referenced at 704) was selected as x2. However, this selection of (x2) 704 cannot be considered as an optimally selected position that does not diminish $TP_{WRTMR}$, because (x2) 704 is not at the midpoint of the OTC. The uneven symmetry of the OTC profile with respect to (x2) 704 indicates that the head 118 is more sensitive to the outside disturbances that cause TMR. The reader-to-writer track TMR can be optimized if x2 is selected instead at the midpoint of the OTC, that is, the offset count position −10 (referenced at 710). By selecting x2 at the midpoint 710 of the OTC, OTC_OD_NEW equals OTC_ID_NEW. The head 118 can better withstand the disturbance that causes the head to move toward the inside diameter direction. For example, the OTC of the head 118 according to FIG. 7 is 96 offset counts However, OTC_ID_OLD 706 (i.e., 30 offset counts) is less than OTC_OD_OLD 708 (i.e., 66 offset counts) due to uneven symmetry. The fact that the OTC_ID_OLD 708 is not as wide as the OTC_OD_OLD 706 as shown by the BER profile 700 indicates that the head 118 is more sensitive to the external disturbances that can displace the head toward the inside diameter. By selecting x2 at the midpoint of the OTC profile at the offset count position −10 (referenced at 710), OTC_ID_NEW 714 and OTC_OD_NEW 712 both equal to 48 offset counts. OTC_ID_NEW 712 is wider than OTC_ID_OLD 708 by 18 offset counts. This 18 offset counts provide additional room for the head 118 to control writer-to-reader TMR in the direction toward inner diameter of the disc 108. Thus, the selection of the midpoint of the OTC (referenced at 710) as x2 as opposed to the lowest BER offset count position (referenced at 704) yields the optimal reader-to-writer offset 410 (i.e., $|x2-x1|$) value that provides more optimal protection against writer-to-reader TMR. In addition, the implementation of the present invention reduces the BER test time and can therefore improve the manufacturing yield of the disc drives. That is, the present invention does not require determination of the offset count position that provides the lowest BER value. In order to measure the lowest BER value, the BER test must be performed across the entire track pitch. To the contrary, the present invention requires measurement of BER at only the two boundary positions of the OTC profile (i.e., the offset count positions −58 and +38). The midpoint 710 can then be computed by knowing the two boundary positions.

Figure 8:
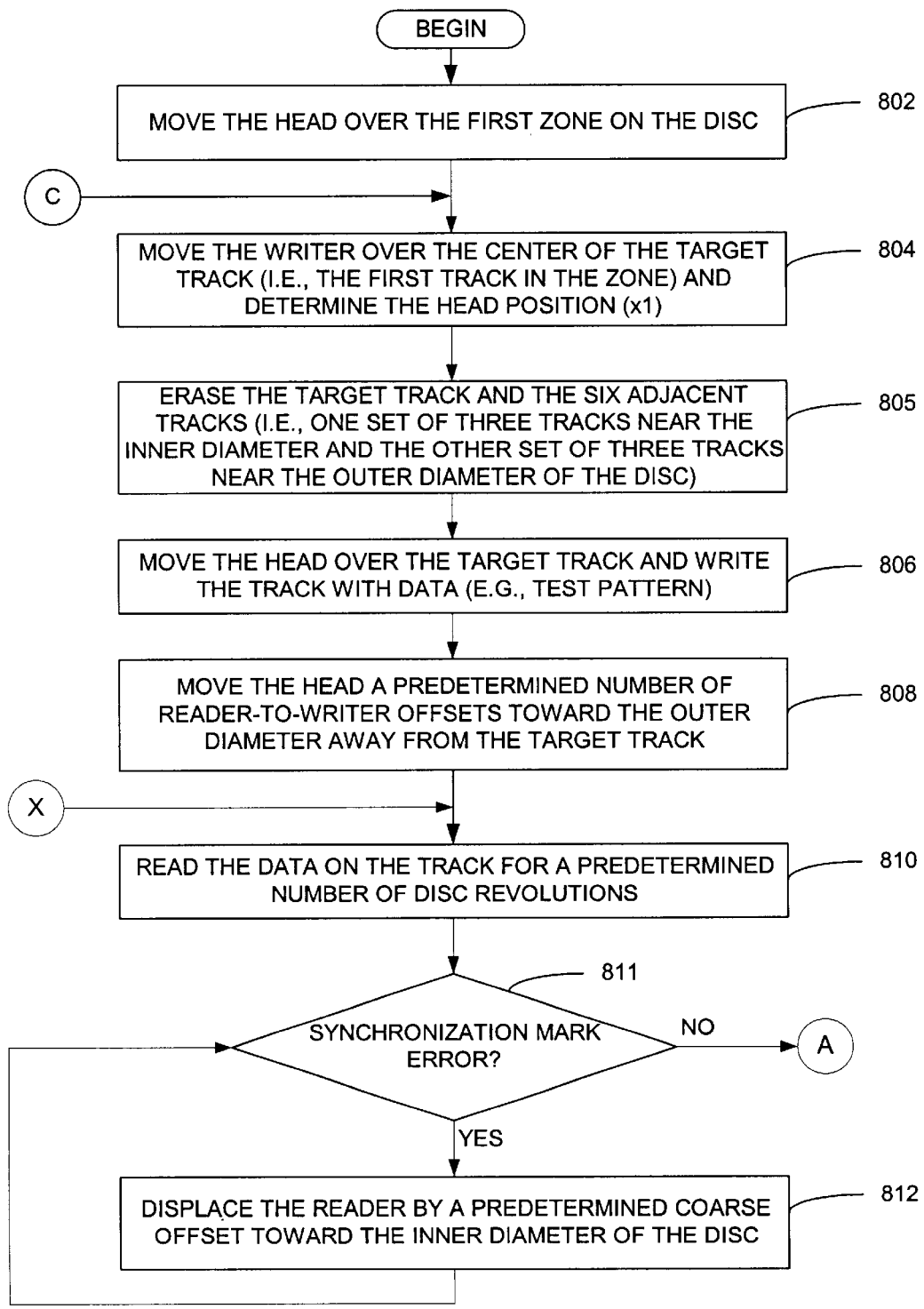
FIGS. 8–10 together comprise a flowchart illustrating operations for determining a reader-to-writer offset for each track on the disc in accordance with an embodiment of the present invention.
Figure 9:
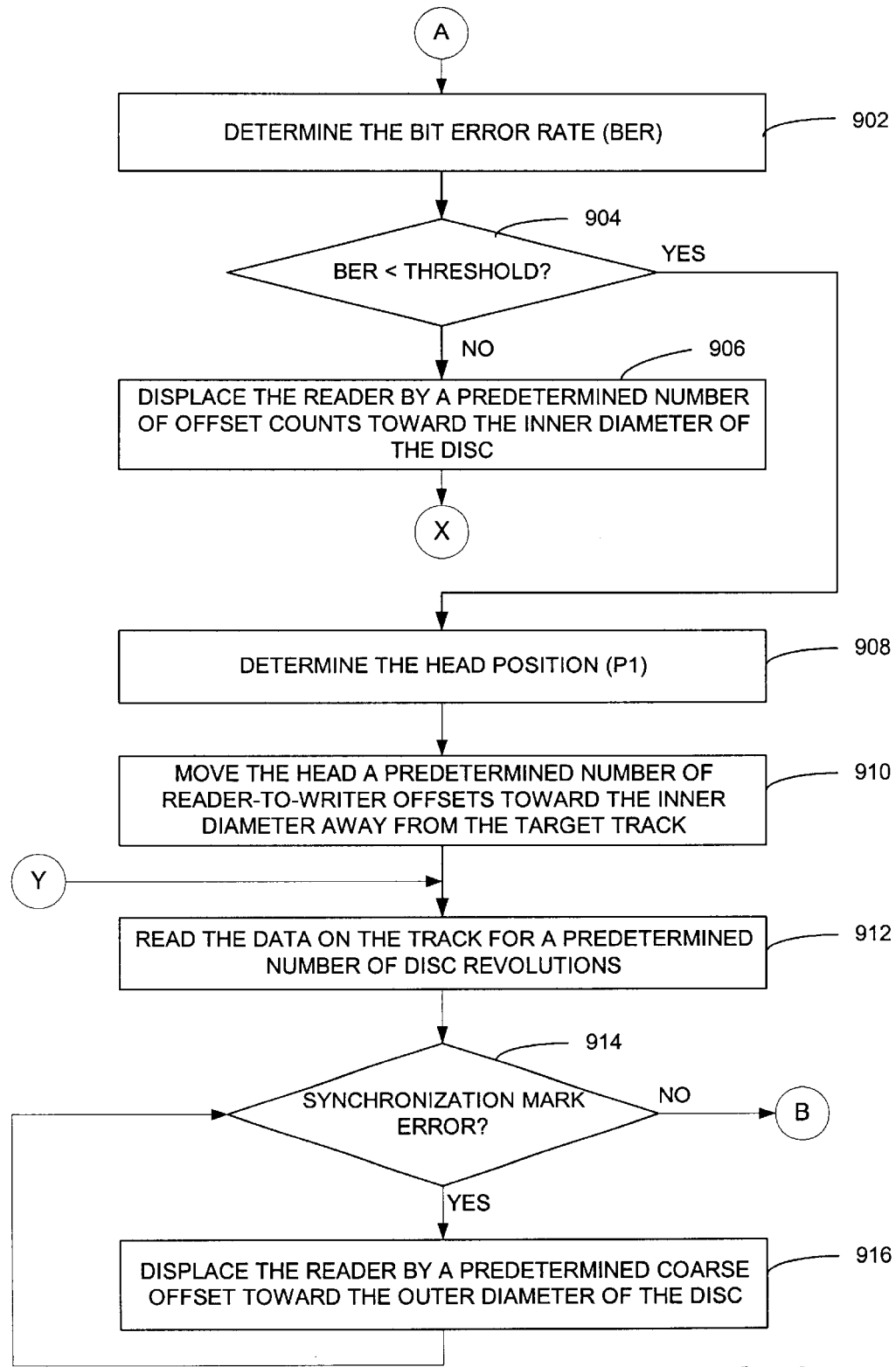
Figure 10:
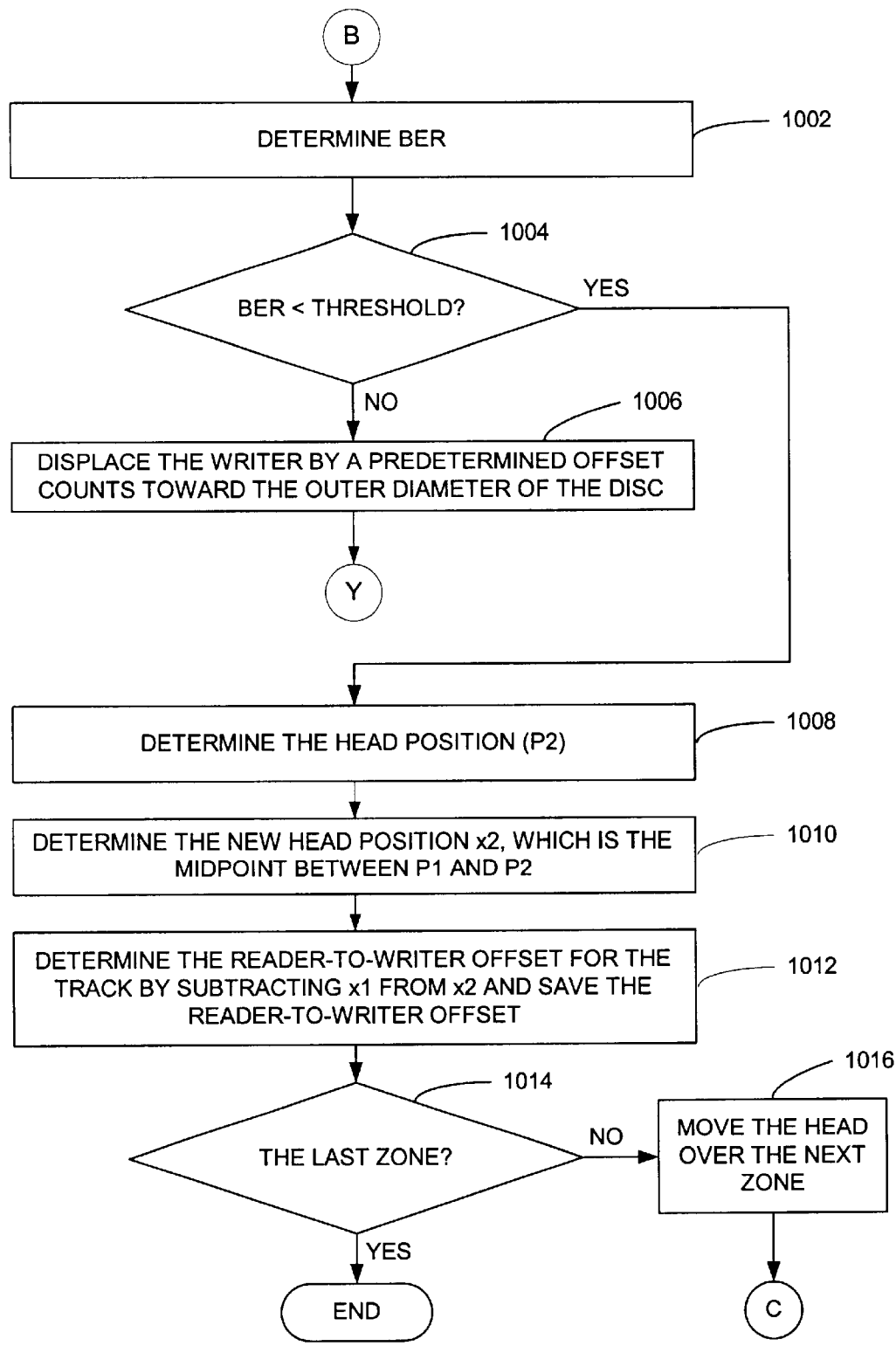

FIGS. 8–10 together comprise a flowchart for determining the optimal reader-to-writer offset for a track in each zone according to an embodiment of the present invention. Typically, thirteen zones are present on the disc, but the optimal reader-to-writer offset is determined on only the first track of each zone. The reader-to-writer offset values for other tracks in each zone are interpolated by utilizing the optimal reader-to-writer offset values determined from the first tracks of the zones. The interpolation technique is described in detail later.

Now referring to FIG. 8, the technique for determining a reader-to-writer offset 410 begins in operation 802 by moving the head 118 over the first zone on the disc. Control then transfers to operation 804, in which operation the head 118 is moved over to the target track, which in this example is the first track in the zone. The writer 404 is moved over the center of the track, and the head position (x1) is then determined. Thereafter, control transfers to operation 805, and any data written on the target track, a set of three tracks that is adjacent the target track toward the inner diameter of the disc, and another set of three tracks that is adjacent the target track toward the outer diameter of the disc (i.e., a total of seven tracks) is erased. The reason for erasing six additional tracks in addition to erasing the target track is that the length of the reader-to-writer offset may be more than a track pitch wide. This is typically the case for the high-density disc drives. The control transfers to operation 806, and the head 118 is moved over the target track and writes the track with data that is typically servo pattern. Operation 808 receives control and moves the head 118 a predetermined number of reader-to-writer offsets (e.g., about three reader-to-writer offsets) toward the outer diameter of the disc away from the center of the target track.

Control transfers to operation 810. In this operation, the reader 402 reads the data over a predetermined number of disc revolutions. The predetermined number of disc revolutions allows the reader 402 to collect sufficient information to compute the BER at this head position. Control transfers to query operation 811, which examines the presence of a synchronization mark error. If the error is present, the operation branches to 812, in which operation, the reader 402 is displaced by a predetermined coarse offset toward the inner diameter of the disc (i.e., toward the center of the target track). Operations 811–812 are repeated until the error is not present. If the error is not present, the operation branches to 902 (now referring to FIG. 9) and determines the BER.

Control then transfers to query operation 904 once the BER is determined. The determined BER is then compared with the minimum threshold BER value to determine whether the determined BER exceeds the minimum threshold BER value. According to an embodiment of the present invention, the minimum threshold BER value was predetermined to be $10^{-5}$. Thus, control transfers to operation 906 if the computed BER is greater than the minimum threshold BER value of $10^{-5}$. Alternatively, control branches to operation 908 if the computed BER is less than or equal to the minimum threshold value of $10^{-1}$.

As described above, the reader 402 reads good data at an offset count position at which position the BER value is less than the minimum threshold BER value. In operation 906, the reader 402 then steps toward the inner diameter of the disc (i.e., toward the center of the track) by a predetermined number of offset counts. Thereafter, operations 810–812 and 902–906 are repeatedly performed until the computed BER is less than or equal to the minimum threshold BER value. If the computed BER is determined to be less than the minimum threshold BER value in operation 904, this means that the first one of the two OTC boundary positions of the track pitch is determined. Control transfers to operation 908, and the head position at this second OTC boundary position (P1) is determined and saved in the memory 143. For example, the offset count position of −58 shown in FIG. 7 is the OTC boundary position (P1).

Control then transfers to operation 910. The head 118 is moved a predetermined number of reader-to-writer offsets (i.e., about three reader-to-writer offsets) toward the inner diameter of the disc away from the center of the target track. Control transfers to operation 912. In this operation, the reader 402 reads the data over a predetermined number of disc revolutions. The predetermined number of disc revolutions allows the reader 402 to collect sufficient information to compute the BER at this head position. Control transfers to query operation 914, which examines the presence of a synchronization mark error. If the error is present, the operation branches to 916, in which operation, the reader 402 is displaced by a predetermined coarse offset toward the outer diameter of the disc (i.e., toward the center of the target track). Operations 914–916 are repeated until the error is not present. If the error is not present, the operation branches to 1002 (now referring to FIG. 10) and determines the BER.

Control then transfers to query operation 1004 once the BER is computed. The computed BER is then compared with the minimum threshold BER value to determine whether the computed BER exceeds the minimum threshold BER value. According to an embodiment of the present invention, the minimum threshold BER value was predetermined to be $10^{-5}$. Thus, control transfers to operation 1006 if the computed BER is greater than the minimum threshold BER value of $10^{-5}$. Alternatively, control branches to operation 1008 if the computed BER is less than or equal to the minimum threshold value of $10^{-5}$.

As described above, the reader 402 reads good data at an offset count position at which position the BER value is less than the minimum threshold BER value. In operation 1006, the reader 402 then steps toward the outer diameter of the disc (i.e, toward the center of the track) by a predetermined number of offset counts. Thereafter, operations 912–916 and 1002–1006 are repeatedly performed until the computed BER is less than or equal to the minimum threshold BER value. If the computed BER is determined to be less than the minimum threshold BER value in operation 1004, this means that the second one of the two OTC boundary positions of the track pitch is determined. Control transfers to operation 1008, and the head position at this second OTC boundary position (P2) is determined and saved in the memory 143. For example, the offset count position of −38 shown in FIG. 7 is the second OTC boundary position (P2).

Control then transfers to operation 1010, where the midpoint (x2) between the first and second OTC boundary positions P1 and P2 is determined. For example, the offset count position −10 shown in FIG. 7 (referenced at 710) is an exemplary midpoint of the OTC profile (x2). Control transfers to operation 1012, and the optimal reader-to-writer offset 410 for the first track in the first zone on the disc is then computed by taking the difference between x1 and x2. Control transfers to query operation 1014, and control ends if the head 118 is over the last zone on the disc. If, however, the head 118 is not over the last zone on the disc, control transfers to operation 1016, and the head is moved over to the next zone. Control transfers to operation 804, and operations 804–812, 902–916, and 1002–1016 are repeated until the optimal reader-to-writer offset 410 is determined for the first track in every zone on the disc.

The data area on the disc is typically divided into thirteen zones, although this number is variable depending on the design choice. During measurement process, the reader-to-writer offset 410 was measured on only the first track of each zone. For other tracks, the reader-to-writer offset values are interpolated. For example, a third-order polynomial may be used to interpolate the offset for each track in between the two first tracks of two consecutive zones. For example, suppose there are 1000 tracks in each zone. Then, the optimal reader-to-writer offset 410 values are measured for tracks 0, 1000, 2000, 3000, 4000 . . . 13000, and a series of equations can be generated from these 13 points:

Offset(0)=a3*(0)³+a2*(0)²+a1*(0)+a0, for track number 0;
Offset(1000)=a3*(1000)³+a2*(1000)²+a1*(1000)+a0, for track number 1000;
Offset(2000)=a3*(2000)³+a2*(2000)²+a1*(2000)+a0, for track number 2000;
Offset(3000)=a3*(3000)³+a2*(3000)²+a1*(3000)+a0, for track number 3000,
. . .
Offset(13000)=a3*(13000)³+a2*(13000)²+a1*(13000)+a0, for track number 13000;
Offset(13999)=a3*(13999)³+a2*(13999)²+a1*(13999)+a0, for track number 13999.

The coefficients [a3, a2, a1, a0] are solved by using the least square method. Then the offset for any track can be accurately estimated based on the coefficients.

In summary, the present invention may be viewed as a method of and an apparatus for generating a reader-to-writer offset (such as 407, 410) for a head (such as 118) positioned over a track (such as 502) on a disc (such as 108) in a disc drive (such as 100) having a plurality of tracks. A reader (such as 402) and a writer (such as 404) are mounted on the head in a non-overlapping manner with a gap between the reader and the writer, which is known as the reader-to-writer offset (such as FIGS. 4–6)

A disc drive controller (such as 100) is operably connected to the reader and the writer. The disc drive controller determines the reader-to-writer offset of the head for each track by computing the difference between a first head position x1 and a second head position x2 (such as operation 916 and FIG. 7). The first head position x1 (such as 406) is an optimal head position for writing information on the track (such as 502) and the second head position x2 (such as 710) is a midpoint of an off-track capability (OTC) of the head (such as 700). The OTC (such as 700) is a portion of a track pitch over which the reader is expected to read information that is free of an incorrigible bit error such that the writer-to-reader track misregistration (TMR) is minimized as the head is radially displaced by the reader-to-writer offset to read information written on the track or to write information on the track (such as FIG. 7).

The head is optimally positioned for writing information on the track when the center of the writer is positioned over the center of the track pitch (such as 406 and FIG. 6). Further, the information written on the track is free of an incorrigible bit error if the bit-error-rate (BER) computed after reading the information over a plurality of disc revolutions is less than a predetermined threshold BER value (such as FIG. 7).

The second head position x2 is determined by measuring a first head position parameter P1 (such as operation 818) and a second head position parameter P2 (such as operation 912) and computing the midpoint between the first head position parameter P1 and the second head position parameter P2 (such as operation 914). The first head position parameter P1 and the second head position parameter P2 are the two end points of the OTC of the head (such as operations 810–818 and 902–912). The first head position parameter P1 is the first head position nearest the first edge of the track pitch on which the BER is less than or equal to the minimum threshold BER value (such as operations 810–818 and FIG. 7). The second head position parameter P2 is the second head position nearest the second edge of the track pitch on which position the BER is less than or equal to the minimum threshold BER value (such as operations 902–912 and FIG. 7).

The first head position parameter P1 is determined by positioning the reader over the first edge of the track pitch (such as operations 808), measuring BER over a predetermined number of disc revolutions (such as operations 810–812), and comparing the BER with the predetermined threshold BER value (such as operation 814). If the BER is greater than the predetermined threshold BER value, the reader is displaced by a predetermined distance toward the center of the track pitch and the steps above are repeated until the BER is less than or equal to the predetermined threshold BER value (such as operations 814 and 816). The head position on which the BER is less than or equal to the predetermined threshold BER value is then stored in a memory (such as operation 818).

The second head position parameter P2 is determined by positioning the reader over the second edge of the track pitch (such as operation 902), measuring BER over a predetermined number of disc revolutions (such as operation 904 and 906), and comparing the BER with the predetermined threshold BER value (such as operation 908). If the BER is greater than the predetermined threshold BER value, the reader is displaced by a predetermined distance toward the center of the track pitch and the steps above are repeated until the BER is less than or equal to the predetermined threshold BER value (such as operation 908 and 910). The head position on which the BER is less than or equal to the predetermined threshold BER value is then stored in the memory (such as operation 912).

It will be clear that the present invention is well adapted to attain the ends and advantages mentioned as well as those inherent therein. While a presently preferred embodiment has been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

What is claimed is:

1. A method of generating a reader-to-writer offset for a head positioned over a track on a disc in a disc drive, wherein a reader and a writer are mounted on the head, the method comprising:

determining a first head position where the writer is optimally positioned for writing information on the track;

determining a second head position as a midpoint of an off-track capability (OTC) of the head, wherein the OTC is a portion of a track pitch over which the reader is expected to read information written on the track that is free of an incorrigible bit error; and computing the difference between the first head position and the second head position to determine the reader-to-writer offset of the head.

2. The method according to claim 1, wherein the first head position is where a center of the writer is positioned over the center of the track pitch.

3. The method according to claim 1, wherein the information written on the track is free of an incorrigible bit error if a bit-error-rate (BER) computed after reading the information over a plurality of disc revolutions is less than a predetermined threshold BER value.

4. The method according to claim 3, wherein the determining a second head position comprises:

measuring a first head position parameter P1 and a second head position parameter P2; and computing a midpoint between the first head position parameter P1 and the second head position parameter P2, wherein the first head position parameter P1 and the second head position parameter P2 are two end points of the OTC of the head, and wherein the first head position parameter P1 is nearest a first edge of the track pitch on which position the BER is less than or equal to the predetermined threshold BER value and that the second head position parameter P2 is nearest a second edge of the track pitch where the BER is less than or equal to the predetermined threshold BER value.

5. The method according to claim 4, wherein measuring a first head position parameter P1 comprises:

positioning the reader at a position over the first edge of the track pitch;

measuring BER over a predetermined number of disc revolutions;

comparing the measured BER with the predetermined threshold BER value;

if the BER is greater than the predetermined threshold BER value, stepping the reader by a predetermined distance toward a center of the track pitch;

repeating the positioning, measuring, comparing, and stepping steps until the BER is less than or equal to the predetermined threshold BER value; and storing in a memory the position where the BER is less than or equal to the predetermined threshold BER value.

6. The method according to claim 4, wherein measuring a second head position parameter P2 comprises:

positioning the reader at a position over the second edge of the track pitch;

measuring BER over a predetermined number of disc revolutions;

comparing the measured BER with the predetermined threshold BER value;

if the BER is greater than the predetermined threshold BER value, stepping the reader by a predetermined distance toward a center of the track pitch;

repeating the positioning, measuring, comparing, and stepping steps until the BER is less than or equal to the predetermined threshold BER value; and storing in a memory the position where the BER is less than or equal to the predetermined threshold BER value.

7. A computer-readable media readable by a computer and encoding instructions for executing the method recited in claim 1.

8. An apparatus for generating a reader-to-writer offset for a head positioned over a track on a disc in a disc drive having a plurality of tracks, wherein a reader and a writer are mounted on the head, the apparatus comprising:

a disc drive controller connected to the reader and the writer operable to determine the reader-to-writer offset of the head for each track by computing the difference between a first head position and a second head position, wherein the first head position is an optimal head position for writing information on the track and the second head position is a midpoint of an off-track capability (OTC) of the head, wherein the OTC is a portion of a track pitch over which the reader is expected to read information that is free of an incorrigible bit error.

9. The apparatus of claim 8, wherein the first head position is where a center of the writer is positioned over a center of the track pitch.

10. The apparatus of claim 9, wherein the information written on the track is free of an incorrigible bit error if a bit-error-rate (BER) determined after reading the information over a plurality of disc revolutions is less than a predetermined threshold BER value.

11. The apparatus of claim 10, wherein the second head position is determined by measuring a first head position parameter P1 and a second head position parameter P2 and computing the midpoint between the first head position parameter P1 and the second head position parameter P2, wherein the first head position parameter P1 and the second head position parameter P2 are two end points of the OTC of the head, and wherein the first head position parameter P1 is nearest a first edge of the track pitch where the BER is less than or equal to the predetermined threshold BER value and that the second head position parameter P2 is nearest a second edge of the track pitch on which position the BER is less than or equal to the predetermined threshold BER value.

12. The apparatus of claim 11, wherein the first head position parameter P1 is determined by positioning the reader at a position over the first edge of the track pitch; measuring BER over a predetermined number of disc revolutions; comparing the measured BER with the predetermined threshold BER value; if the BER is greater than the predetermined threshold BER value, stepping the reader by a predetermined distance toward a center of the track pitch; and repeating the steps above until the BER is less than or equal to the predetermined threshold BER value.

13. The apparatus of claim 11, wherein the second head position parameter P2 is determined by positioning the reader at a position over the second edge of the track pitch; measuring BER over a predetermined number of disc revolutions; comparing the measured BER with the predetermined threshold BER value; if the BER is greater than the predetermined threshold BER value, stepping the reader by a predetermined distance toward a center of the track pitch; and repeating the steps above until the BER is less than or equal to the predetermined threshold BER value.

14. An apparatus for generating a reader-to-writer offset for a head positioned over a track on a disc in a disc drive having a plurality of tracks, wherein a reader and a writer are mounted on the head, the apparatus comprising:

a disc drive controller operably connected to the reader and the writer; and means for computing a difference between a first head position and a second head position, wherein the first head position is an optimal head position for writing information on the track and the second head position is a midpoint of an off-track capability (OTC) of the head, wherein the OTC is a portion of a track pitch over which the reader is expected to read information that is free of an incorrigible bit error.

15. The apparatus of claim 14, wherein the first head position is where the center of the writer is positioned over the center of the track pitch.

16. The apparatus of claim 14, wherein the information written on the track is free of an incorrigible bit error if a bit-error-rate (BER) determined after reading the information over a plurality of disc revolutions is less than a predetermined threshold BER value.

17. The apparatus of claim 16, wherein the means for computing comprises measuring a first head position parameter P1 and a second head position parameter P2 and computing a midpoint between the first head position parameter P1 and the second head position parameter P2, wherein the first head position parameter P1 and the second head position parameter P2 are two end points of the OTC of the head.

18. The apparatus of claim 17, wherein the first head position parameter P1 is a first head position nearest a first edge of the track pitch having a BER less than or equal to the predetermined threshold BER value and the second head position parameter P2 is a second head position nearest a second edge of the track pitch having a BER less than or equal to the predetermined threshold BER value.

19. The apparatus of claim 18, wherein the means for computing comprises determining the first head position parameter P1 positioning the reader at a position over the first edge of the track pitch, measuring a BER over a predetermined number of disc revolutions, comparing the measured BER with the predetermined threshold BER value, and, if the BER is greater than the predetermined threshold BER value, stepping the reader by a predetermined distance toward the center of the track pitch, and repeating the steps of measuring, comparing, and stepping until the BER is less than or equal to the predetermined threshold BER value.

20. The apparatus of claim 18, wherein the means for computing comprises determining the second position parameter P2 positioning the reader at a position over the second edge of the track pitch, measuring a BER over a predetermined number of disc revolutions, comparing the measured BER with the predetermined threshold BER value, and, if the BER is greater than the predetermined threshold BER value, stepping the reader by a predetermined distance toward the center of the track pitch, and repeating the steps of measuring, comparing, and stepping until the BER is less than or equal to the predetermined threshold BER value.

* * * * *